United States Patent [19]
Humphries

[11] 3,891,490
[45] June 24, 1975

[54] WELDED POLYMERIC ARTICLES AND PROCESS
[75] Inventor: William H. Humphries, Fremont, Calif.
[73] Assignee: Raychem Corporation, Menlo Park, Calif.
[22] Filed: June 6, 1974
[21] Appl. No.: 476,895

[52] U.S. Cl. .................. 156/295; 156/87; 156/157; 156/218; 156/304; 156/306; 156/334; 156/583
[51] Int. Cl... B29c 19/00; B29d 23/10; B32b 31/00
[58] Field of Search .................... 156/87, 157–159, 156/203, 218, 266, 293, 295, 304, 306, 334, 502, 583; 161/36, 139; 138/99, 170, 171; 285/21, 22

[56] References Cited
UNITED STATES PATENTS
3,008,862  11/1961  Haine et al. ............... 156/295 X
3,166,458  1/1965   Chinn et al. ............... 156/295
3,276,929  10/1966  Ferch ......................... 156/158 X
3,617,419  11/1971  Fischer et al. ............. 156/334 X Primary Examiner—William A. Powell
Attorney, Agent, or Firm—Lyon & Lyon

[57] ABSTRACT

Described herein are butt-welded polymeric articles and means of effecting joinder of cross-linked polymeric articles by means of such welds. The invention finds application in, e.g., forming large-diameter heat recoverable sleeves from cross-linked polymeric sheets, e.g., cossosion-proofing pipe joints and the like. The weld is effected by heating under compression a plurality of thermoplastic inserts spaced along the ends of the polymeric articles to be welded, the inserts containing a peroxide or other heat activated cross-linking agent.

9 Claims, 6 Drawing Figures

WELDED POLYMERIC ARTICLES AND PROCESS

BACKGROUND OF THE INVENTION

Thin-walled polymeric articles are commonly cross-linked, as by the agency of high energy, ionizing radiation, to impart form stability at melt temperatures. Again, such articles are commonly irradiated or otherwise cross-linked in the course of producing heat recoverable or heat shrinkable articles like those disclosed in Cook U.S. Pat. No. 3,086,242, the disclosure of which is incorporated herein by reference. Heat recoverable sleeves have been found highly effective as corrosion resistant coverings for pipe joints as disclosed in Wetmore U.S. Pat. No. 3,297,819, Conde U.S. Pat. No. 3,379,218, Heslop et al. U.S. Pat. No. 3,415,287, Ellis U.S. Pat. No. 3,455,336, Wilson U.S. Pat. No. 3,530,598 and Evans U.S. Pat. No. 3,770,556, the disclosures of which are incorporated herein by reference. Large diameter pipes are, of course, widely used in many industries, including the oil and gas transmission industries. Large diameter sleeves cannot conveniently be extruded, so that heretofore such sleeves have most commonly been made in a "wrap-around" configuration such as those shown in the Conde, Ellis, Wilson, and Evans Patents noted above. Most commonly in the case of such devices, the sleeve is formed in situ in the field when opposed edges of the wrap-around device are brought into adjacency and secured, one to the other, by mechanical means. To expedite field installation, it would be advantageous to supply to the field a pre-formed large diameter sleeve, and to this end it has hitherto been proposed to overlap the opposite edges of a polymeric sheet, disposing between the overlapping segments a peroxide cross-linking agent which is then cured. Thus far, that resort has in large part proved unsuccessful because, apparently owing to uneven cross-link formation, the edges of the overlapped surfaces pucker severely upon expansion, presenting an unsightly weld conceivably subject to failure in the peel mode. The art known method of disposing thermoplastic materials between cross-linked polymeric articles to be joined, whereafter the thermoplastic substance is heated to its melt temperature, is unsuited to the production of heat recoverable sleeves because the process by which heat recoverability is imparted involves expansion of the sleeve at high temperatures calculated to occasion the failure of any thermoplastic joint.

In order to overcome the problems associated with the thermoplastic bonding agent for use with heat recoverable sleeves which are subjected to relatively high temperatures, Naidoff, Ser. No. 436,674, filed Jan. 25, 1974, and assigned to the same assignee as the present invention, discloses a thermoplastic insert containing a peroxide or other heat activated cross-linking agent which effects formation of covalent cross-links between the surfaces of the cross-linked polymeric article and the thermoplastic insert. It was found that the modulus of the resulting cross-linked butt weld from such an insert was at least equal to and often greater than that of the joined article. Joints formed according to that disclosure withstood at high temperature the substantial tensile stresses imposed during sleeve expansion. That reference is herein incorporated by reference, and discloses a variety of thermoplastic polymeric compositions containing heat activated cross-linking agents.

Although the thermoplastic compositions disclosed by Naidoff exhibit exceptional strength when used in joining cross-linked material, even after being subjected to high temperatures, the specific insert configurations disclosed by Naidoff do not always lend themselves to compression bonding. More specifically, Naidoff discloses generally "I" shaped, in cross-section, thermoplastic inserts which run the length of the cross-linked polymeric sheets to be joined. In bonding such sheets by means of heated pressure platens driven by a plurality of spaced cylinders, the pressure exerted by the platen onto the insert may vary slightly, the greatest pressure being exerted beneath the driving cylinders. Such a variance in platen pressure may result in a variation in thickness along the joint.

More importantly, during compression molding, of such an insert, which involves the chemical cross-linking of the thermoplastic insert with the surfaces of the cross-linked articles to be joined, gaseous by-products are often formed and must be removed to prevent bubbling or blistering at the joint. In addition, entrapped air must also be removed to obtain a smooth, uniform bond.

It is thus an object of this invention to provide thermoplastic inserts containing a cross-linking agent which will flow to a uniformed thickness upon compression bonding, notwithstanding variation in platen pressure.

It is another object of this invention to provide inserts which allow for the escape of entrapped air and gaseous by-products during the compression bonding operation.

BRIEF SUMMARY OF THE INVENTION

These objects are accomplished by providing a method of integrally joining abutting surfaces of cross-linked polymeric articles which comprises disposing a plurality of thermoplastic inserts spaced along the length of the cross-linked articles to be joined, the spaces between inserts allowing for the flow of material and the escape of trapped gases. By properly dimensioning and spacing the inserts, so that inserts beneath high pressure areas will flow to spaces beneath low pressure areas, a uniform weld of constant thickness across the entire width of the articles joined can be achieved. Of course, where maximum strength is not required, or complete sealing of the article is not necessary, a fewer number of inserts, spaced further apart, may be used. In this case, the plastic from adjacent inserts need not flow together.

DETAILED DESCRIPTION OF THE INVENTION

Figure 1:
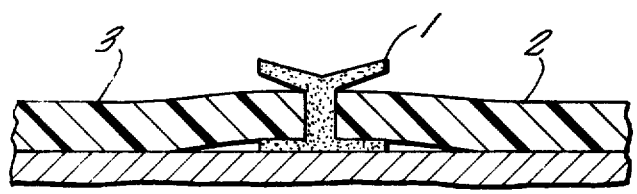
FIG. 1 is a cross-section of a thermoplastic insert taken along the length of the sheets to be joined prior to compression bonding.

In preferred embodiments, sleeves are formed by welding the edges of polymeric sheet, one to another. Articles to be joined by the practice of this invention may be formed from essentially any polymeric material capable of being cross-linked by the agency of heat activated systems, e.g., polyolefins, polysiloxanes, unsaturated polyesters, polyvinyl halides, natural rubber, etc. Most preferred are the polyolefins e.g., polyethylene; poly(butene-1); various copolymers of ethylene, propylene and butene; ethylene ethyl acrylate, ethylene vinyl acetate, or ethylene methacrylate copolymers in which repeat units derived from the ethylene comonomer predominate (e.g., about 80-96%), and blends of such copolymers containing major proportions of polyethylene itself.

As previously noted, the polymeric articles to be joined are cross-linked from the outset, and preferably exhibit modulus in the range from about 20 to about 60 psi. As used herein, "the term modulus" connotes modulus determined at 150°C and 100% elongation. Articles to be joined are preferably cross-linked by high energy ionizing radiation, dosage ranging from, e.g., about 5 to about 20 megrads, preferably from about 12 to about 15 megrads.

The invention finds its preferred application in the joinder of thin-walled articles (e.g., sheet ranging in thickness from about 60 to about 120 mils). An article is "thin-walled" for present purposes when its thickness is substantially less than length or width. Reference to the "primary faces" of joined articles connotes that surface which is the product of length and width as so defined. The invention has proven ideally suited to joining polymeric sheet to form sleeves whose recovered diameter is equal to or greater than 12 in., and commonly equal to or greater than about 18 in.

The polymeric constituent of the thermoplastic insert can be chosen within wide bounds, including a great variety of melt processable materials capable of being cross-linked by heat activated systems. Since the cross-linking agent is most desirably blended with the polymeric constituent of the insert in the melt phase, a predominant consideration in choice of insert thermoplastic is melt processability at temperatures less than the heat activation temperature of the cross-linking agent. With the polyethylenic materials most preferably employed in the articles to be joined, preferred insert polymeric constituents include ethylene-vinyl acetate, ethylene-methyl acrylate and ethylene-ethyl acrylate copolymers and blends of such copolymers with minor proportions of polyethylene. Such copolymers commonly contain on the order from about 60 to about 96% by weight repeat units corresponding to the ethylene comonomer, and most commonly contain from about 80 to about 96% by weight of such units.

A wide variety of systems may be mentioned as candidates for cross-linking employment, including bisazodicarboxylates such as methyl and ethyl bisazodiformates, sulfonazides such as 1, 10-decane bis(sulfonazide), azodicarbonamine, 3,3'-dimethoxy-4,4'-diazodiphenyl and 2,2'-azobisisobutyronitrile. Most preferred are peroxide cross-linking agents, e.g., t-butyl perbenzoate, 2,5-dimethyl-2,5-di(t-butyl peroxy) hexyne-3,dicumyl peroxide, benzoyl peroxide, methylethylketone peroxide, cumene hydroperoxide t-butyl hydroperoxide and di-t-butyl peroxide. Such agents are employed in effective cross-linking proportions, as in conventional practice. Most commonly, the agents obtained are coated on a calcium carbonate or other particulate substrate, and are employed in proportions ranging from about ¼ to about 2% by weight active agent, most preferably from about ½ to about 1% by weight active agent. Especially where the amount of cross-linking agent employed is at the lower end of the foregoing ranges, and most especially where non-peroxide cross-linking agents are used, it is preferred to additionally combine in the insert a so-called "co-agent" to maximize the number of crosslinks formed through the agency of a given number of free radicals generated by the agent itself. The use of such coagents is conventional and is discussed in, e.g., L.P. Lenaf, *I & E. Chem. Prod. Research & Development*, 2, No. 3, 202 (1963), which publication is incorporated herein by reference. Among conventionally employed co-agents may be mentioned m-phenylene dimaleimide, trimethylol propane trimethacrylate, pentaerythritol tetra-acrylate, triallyl cyanurate, triallyl isocyanurate, allyl methacrylate, diallyl phthalate, triallyl citrate, tetra-allyl pyromellitate and triallyl mellitate. Such co-agents are employed in minor proportions, e.g., 0.5 to 2%, most preferably from about ½ to about 1% by weight. The objects in proportioning cross-linking agent and coagent are two-fold. Cross-linking must be sufficient to ensure that the modulus of the ultimate weld is at least equal to, and preferably greater than, that of the thinwalled articles joined. Otherwise, the weld may be subject to failure during the high temperature expansion associated with the impartation of heat recoverability. On the other hand, care must be taken to ensure that the weld is not cross-linked to too great an extent, with concomitant embrittlement. Preferably, the modulus of the weld is not greater than about twice that of the article joined. Weld modulus can in particular cases range from about 20 to about 250 psi. However, a substantial failure rate may be experienced at moduli greater than about 150, and most preferably the weld modulus is in the range from about 50 to about 100 psi.

Of course, in addition to cross-linking agent, polymeric constituent and, where used, co-agent, the weld may contain additional conventional addends, e.g., filler, ultraviolet stabilizers, antioxidants, acid acceptors, etc. Fillers such as carbon black, calcium carbonate and the like are employed in substantial (albeit minor) proportions in order to, inter alia, assist in conducting heat from surface to the interior of the insert. Preferably, on the order of about 20% such filler is employed. Specific examples of various compositions useful as inserts for bonding cross-linked articles are disclosed in Ser. No. 436,694 filed Jan. 25, 1974 previously incorporated by reference.

Figure 2:
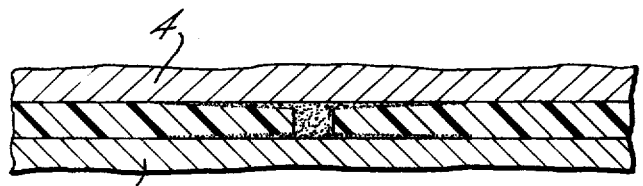
FIG. 2 is a cross-section taken along the sheet lengths of the insert during bonding.
Figure 3:
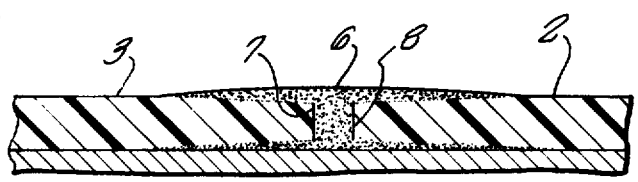
FIG. 3 is a cross-section taken along the sheet lengths of the insert after bonding.

Welding is effected at temperatures sufficient to cause the polymeric constituent of thermoplastic to flow and wet the surface of the articles to be joined, and also sufficient to activate the cross-linking system. FIGS. 1–3 depict in sequence a typical welding operation taken in cross-section along the length of the sheets to be joined. Inserts 1 generally "I" shaped in cross-section is disposed between the abutting edges of polymeric sheet segments 2 and 3, the edges of the segments being inserted in the channels bottoming on the upstanding portion of the "I". The resulting assembly is compressed, as by heated platens 4 and 5 (FIG. 2), which cause the polymeric constituent of the inserts to flow together and wet adjoining surfaces of the segments to be joined. Preferably, dams (not shown) approximating in thickness the compressed thickness of the polymeric sheet are disposed at either end of the insert and prevent excessive out flow of the melted insert at the weld ends.

Once cross-linking between the melted insert and the polymeric sheet has been effected, the platen may be cooled to reduce the joint in temperature, whereafter the upper platen 4 is withdrawn, freeing the formed joint (FIG. 3). The platens may be conventionally heated, either electrically or with steam. Preferably, heating and cooling are effected by sequentially forcing steam and cooling water through passageways formed in the platen itself.

With reference to FIG. 3, it will be noted that the resulting butt-weld 6 is contiguous with both the aligned edges 7 and 8 of sheets 2 and 3 and with regions of their primary surfaces immediately adjacent those edges. In this fashion, the weld is made continuous past the aligned edges of the polymeric sheet, so that failure along the interfaces between the weld and edges 7 and 8 is discouraged. To this end, the inserts are so configured and positioned as to ensure that those regions of the primary sheet surfaces are wetted during insert melting. The generally "I" shaped insert depicted in FIGS. 1-3 is designed with this in mind.

Figure 4:
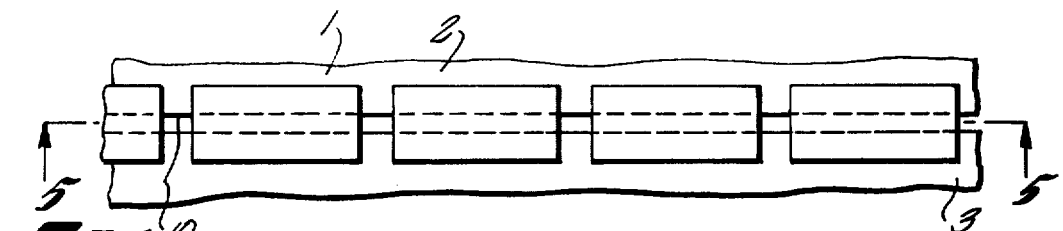
FIG. 4 is a top view of the inserts along the width of the articles to be bonded.
Figure 5:
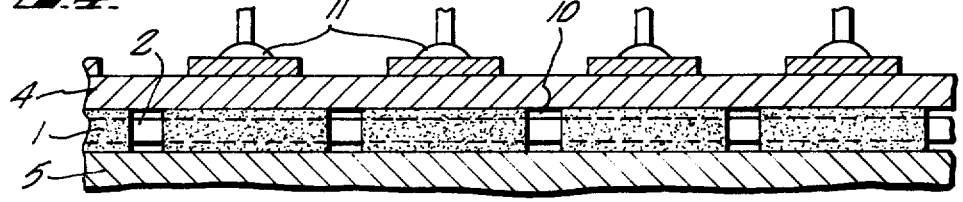
FIG. 5 is a cross-section of the sheet widths taken along line 5—5 of FIG. 4 at the beginning of the bonding operation.
Figure 6:
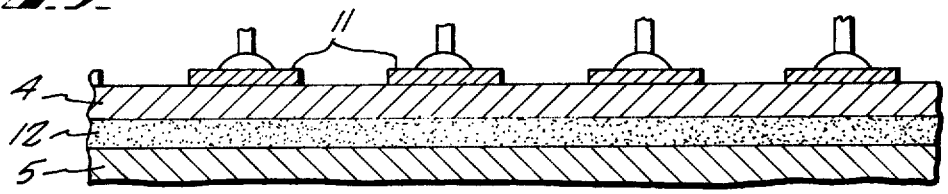
FIG. 6 is a cross-section along line 5–5 of FIG. 4 at the end of the bonding operation.

FIGS. 4-6 highlight the feature of this invention which depict the use of a plurality of inserts to allow for outgasing and to produce more uniform joint throughout the width of the articles joined. FIG. 4 is a top view of a plurality of "I" shaped inserts spaced a predetermined distance apart and into which have been inserted cross-linked articles 2 and 3.

FIG. 5 generally shows the articles to be bonded, taken along line 5-5 of FIG. 4 at the start of the bonding process. Upper platen 4 is driven by cylinders 11 which results in the greatest pressure exerted by the platen to be centered at a point directly beneath the cylinder. This in turn causes a greater deflection of the platen at that point, resulting in the least deflection and the widest gap at some point between the cylinders. Such variation in platen pressure and deflection causes a ripple joint when one continuous thermoplastic insert is used along the width of the aritcles to be joined. Space 10, between inserts, are preferably positioned at points of low pressure and deflection, so that upon compression of the thermoplastic insert, the plastic will readily flow to the space area. By properly spacing the inserts, a uniform bond throughout the width of the article as depicted in FIG. 6 can be achieved.

In addition, spaces 10 permit the escape of trapped air and gaseous by-products of the cross-linking reaction, so that the final bond, 12, is free of voids.

The width of the inserts, and the space between inserts, will of course be dictated by the particular material and the bonding parameters. However, preferably, the inserts should be so spaced that they will flow together to form one continuous bond of uniform thickness. Of course, where complete sealing of the article joined is not required, spacing between inserts in the final product can be tolerated, to give a "hinge" configuration.

In the preferred embodiment in which the welding process of this invention is used to form large diameter sleeves intended for the impartation of heat recoverability, the weld-formed sleeves are heated to above the crystalline melting temperature of the sheet of which the sleeve expansion is disclosed in the commonly assigned, application of Greuel and Naidoff entitled "Expansion Apparatus", Ser. No. 436,675, filed Jan. 25, 1974.

EXAMPLE

Cross-linked polymeric sheets of high density polyethylene (melt index 0.2, density 0.95) and a copolymer of ethylene and methyl acrylate (20% methyl acrylate), blended in a proportion of 56:20, 60 mils thick (modulus=15-30 psi) were welded via a plurality of thermoplastic inserts.

The thermoplastic inserts comprised an ethylene-vinyl acetate copolymer, with 20% carbon black filler, and 1% 2,5-dimethyl-2,5-di(t-butyl peroxy) hexane on an inert carrier and 1% lead fumarate acid accepter.

"I" shaped inserts, 4 inches in length were spaced ¾ inches apart along the ends of sheets approximately 20 inches wide. The sheets were bonded at a platen temperature of 205°C and a pressure of approximately 30 psig.

Four driving cylinders approximately 4 inches in diameter were utilized to drive a 36 inch platen. After approximately 7 minutes bond time, a uniform joint throughout the width of the articles was obtained, with the modulus of the joint being greater than 140 psi. Upon visual inspection, no voids or ripples were apparent and the inserts had flowed together to form one continuous bond of uniform thickness.

I claim:

1. A method of integrally joining abutting surfaces of cross-linked polymeric articles which comprises disposing between said surfaces a plurality of spaced inserts consisting essentially of thermoplastic polymeric composition containing an effective cross-linking amount of a heat activated cross-linking agent, and heating said surfaces and inserts under compression for a time and at a temperature sufficient to cause said inserts to flow and wet said surfaces and to activate said cross-linking agent, effecting formation of covalent cross-links between each of said surfaces and the polymeric constituent of said inserts, the modulus of the resulting cross-linked butt weld being at least equal to that of said articles.

2. A method of integrally joining abutting edges of cross-linked polymeric sheet which comprises disposing between said edges of plurality of spaced inserts consisting essentially of a thermoplastic polymeric composition containing an effective cross-linking amount of a heat activated cross-linking agent, and heating said surfaces and inserts under compression for a time and at a temperature sufficient to cause said inserts to flow and wet said edges and to activate said cross-linking agent, effecting formation of covalent cross-links between each of said edges and the polymeric constituent of said inserts, the modulus of the resulting cross-linked butt weld being greater than that of said sheet.

3. A method of integrally joining abutting edges of cross-linked polymeric sheet which comprises disposing between said edges a plurality of spaced inserts consisting essentially of a thermoplastic polymeric composition containing an effective cross-linking amount of a heat activated cross-linking agent, and heating said surfaces and inserts under compression for a time and at a temperature sufficient to cause said inserts to flow filling the space between said inserts and wetting said edges and to activate said cross-linking agent, effecting formation of covalent cross-links between each of said edges and the polymeric constituent of said inserts, the modulus of the resulting cross-linked butt weld being greater than that of said sheet and whereby a uniform thickness, substantially void free joint along the width of the weld is obtained.

4. The method of claim 3 wherein said edges are opposite edges of a single such sheet.

5. The method of claim 4 wherein said polymeric composition additionally contains, in minor effective proportion, a polyfunctional coagent for said cross-linking agent.

6. The method of claim 5 wherein said cross-linking agent is a peroxide cross-linking agent.

7. The method of claim 6 wherein said sheet is predominately comprised of polyethylene and wherein the polymeric constituent of said inserts is selected from the group consisting of ethylene-vinyl acetate, ethylene-methyl acrlate and ethylene-ethyl acrylate copolymers and blends of said copolymers with minor proportions of polyethylene.

8. The method of claim 3 wherein said inserts are disposed between said edges in such fashion as to ensure that, upon heating under compression, the melted inserts wet the primary surfaces of said sheet immediately adjacent said edges.

9. The method of claim 8 wherein said inserts are generally "I" shaped in cross-section, said edges being inserted in the channels bottoming on the upstanding portion of the "I" prior to the heating step.

* * * * *